United States Patent [19]

Chambers

[11] 3,934,883

[45] Jan. 27, 1976

[54] DISK RECORD PLAYER

[76] Inventor: Robert L. Chambers, 2148 NW. 48th St., Miami, Fla. 33142

[22] Filed: Jan. 10, 1974

[21] Appl. No.: 432,190

[52] U.S. Cl.............. 274/9 B; 274/23 A; 274/1 R; 360/105; 360/97
[51] Int. Cl.² ........................................ G11B 15/00
[58] Field of Search ................ 274/9 B, 23 A, 1 R; 360/105, 917, 86; 179/1 A

[56] References Cited
UNITED STATES PATENTS

| | | | |
|---|---|---|---|
| 2,100,686 | 11/1937 | Collaro et al. | 274/9 B |
| 2,508,715 | 5/1950 | Harmon | 274/9 B |
| 2,508,715 | 5/1950 | Harmon | 274/9 B |
| 3,658,347 | 4/1972 | Cheesboro | 274/9 B |

*Primary Examiner*—Richard E. Aegerter
*Assistant Examiner*—Larry Jones
*Attorney, Agent, or Firm*—Malin & Haley

[57] ABSTRACT

A disk record player having no turntable or spindle and driveable from a conventional magnetic tape player. The record disk is held in position and rotated by circumferentially engaged rollers, each roller having a circumferential groove. The unit can be utilized in a small space and in a mobile environment such as an automobile, and is unaffected by sudden movements, bumps or jolts.

2 Claims, 5 Drawing Figures

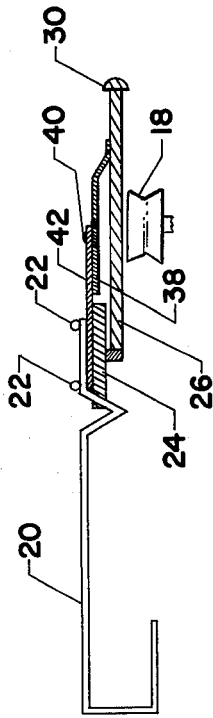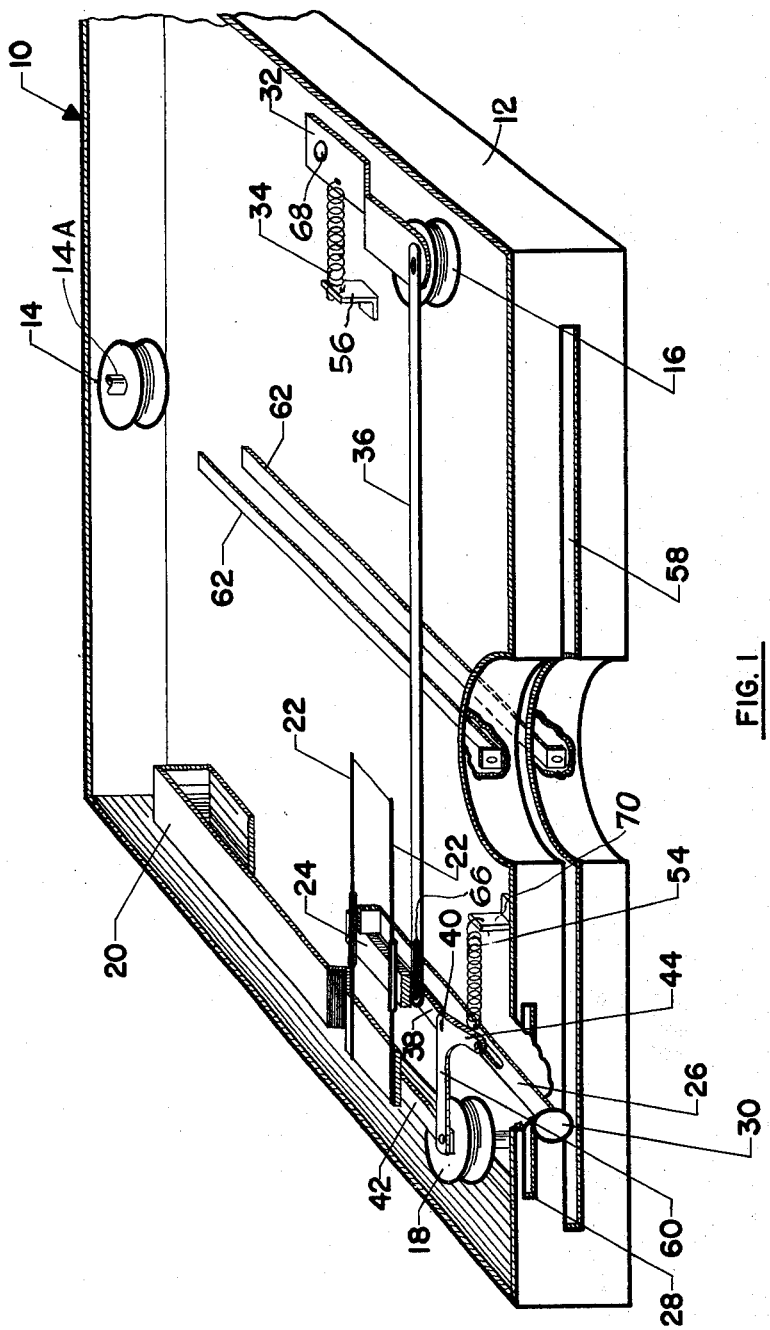

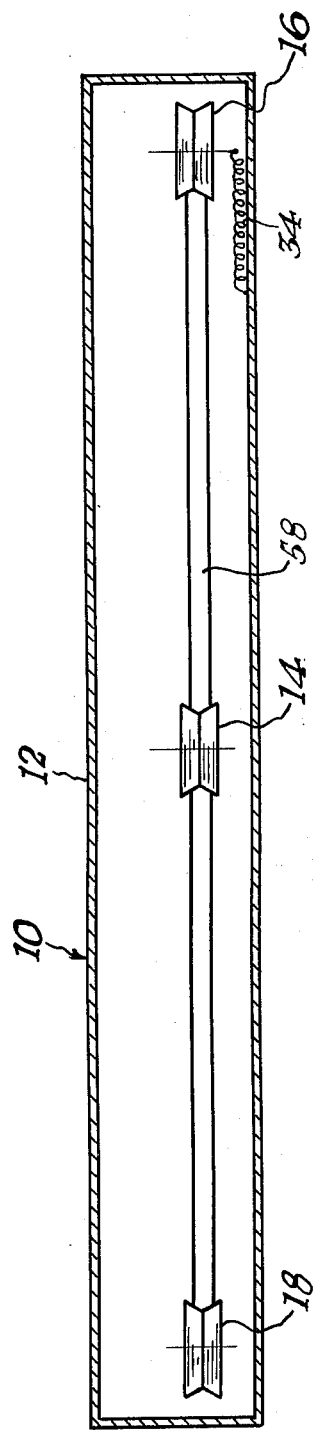

DISK RECORD PLAYER

BACKGROUND OF THE INVENTION

This invention relates generally to the field of mechanical-electromagnetic audio reproduction disk players, and more specifically, to an improved mechanical, disk playout device that may be utilized in a mobile environment and driveably mounted on a magnetic tape recorder, each playout device having a common driving means and amplifying means, thus alleviating the necessity of having two separate drive and amplification units for different types of players (disk and tape).

In recent years it has been common to own both a disk record player for disk recordings and also a magnetic tape player for tape recordings. Many tape players have been installed in vehicles, such as automobiles, to provide the owner with listening enjoyment while driving his automobile. However, many people possessing disk records are unable to utilize their records in their vehicles because no satisfactory mobile disk player has been provided. Applicant's invention solves the problem of playing a disk record in a mobile environment without distorting or interrupting audio playout of the record, while providing a device that may be coupled and mounted to a conventional tape player. Thus, applicant's invention provides an add-on disk record player unit attachable to a conventional tape recorder or cassette recorder that may be mounted in a vehicle, each unit utilizing a common drive and amplification means.

BRIEF DESCRIPTION OF THE INVENTION

A disk record drive and playout device attachable to a conventional magnetic tape player of utilization in a mobile environment comprising a housing, a plurality of rollers coupled to said housing and disposed in a common plane an equal radial distance from a predetermined point, drive motor coupling means connected to at least one of said rollers projecting through said housing, resilient means connected to at least one roller, said roller pivotally connected to said housing, disk audio playout cartridge means, a cartridge support means coupled to said housing, said playout cartridge means moveably mounted on said support means, audio circuit means connected to said playout means, and an externally mounted jack plug coupled to said audio circuit means. The housing is box-shaped and includes a plurality of planar faces, the front vertical face having a slot aligned with the roller common plane. External mounts are provided on the housing to rigidly mount the housing to a conventional tape player. A cartridge lifting means is provided to lift the cartridge during record insert or retraction.

To operate applicant's device, the disk record unit is coupled to a driving means such as in a tape recorder or the like. One of the rollers has a driveable shaft protruding through the housing which engages a driving means. To operate applicant's device, a disk record is inserted in the front face slot where it engages two of the rollers forcing one that is pivotally mounted to the housing to move sideways. The side movement engages a linking means which raises the cartridge so that the needle in the cartridge does not scrape the record face. The rollers are positioned so that when the record engages all three rollers simultaneously the cartridge will then engage the disk record surface and will be held firmly in place by the three rollers. The driving roller then rotates the disk record and the rotational movement and the engagement of the needle in the record groove drives the cartridge across the record face until the selection is completed. At this time the record may be removed and retracted from the housing by either a manual linkage arm which will raise and reposition the cartridge to its initial starting position or by pulling the record out which again lifts the cartridge preventing the cartridge needle from engaging the face of the record. The relative positions of the rollers is crucial to the proper operation of the cartridge lift mechanism in that the rollers must be radially disposed from the center of the disk record an equal distance but the pivotal roller must be spaced from the adjacent roller a distance that is less than the total diameter of the record so that it will move laterally when the record is inserted or retracted. Of course, the unit could maintain its own driving means and audio playout means which are conventional and known in the art, or the roller can be mounted as discussed with an adapter to be driven from a common drive means in tape deck to which the disk record player is coupled to.

It is an object of this invention to provide a novel disk record driving mechanism that is not affected by jars or bumping and may be utilized in a mobile environment to provide reproduction and amplification of impressions recorded on the disk.

It is another object of this invention to provide a disk recording device that is removably connected to a conventional magnetic tape recorder or cassette player whereby both the disk player and the tape recorder will have a common driving mechanism.

And yet another object of this invention is to provide a disk record playout device that may be mounted in a vehicle.

And still yet another object of this invention is to provide a combination disk record playing device and tape cassette recording playout device which are mountable together in a vehicle or small space and may be utilized for either the playing of a disk record or tape cassette.

In accordance with these and other objects which will be apparent hereinafter, the instant invention will now be described with particular reference to the accompanying drawings.

BRIEF DESCRIPTION OF THE DRAWINGS

FIG. 1 shows a perspective view of applicant's invention with the housing top removed and the front vertical housing face partially cut-away.

FIG. 3 shows a front elevational view of the disk record support mechanism utilized in applicant's invention.

FIG. 4 shows side elevation of the cartridge lifting mechanism of applicant's invention.

PREFERRED EMBODIMENT OF THE INVENTION

Figure 2:
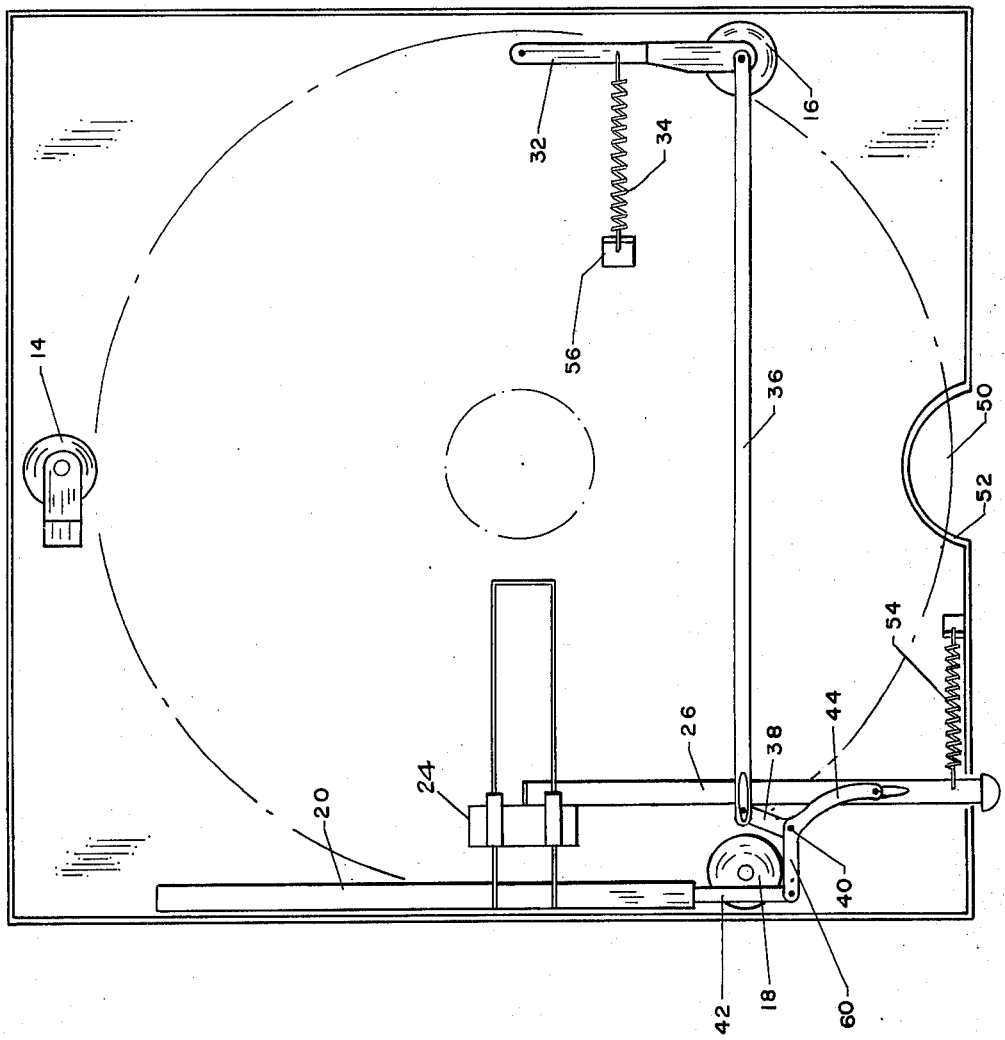
FIG. 2 shows a top plan view of the operating mechanism of applicant's invention with the housing top removed.

Referring now to the drawings and especially FIG. 1, Applicant's invention is shown generally at 10 comprising a substantially rectangular housing 12 (with the top removed) displaying the inner mechanism which includes a disc record support and drive adaptor mechanism. Three rollers 14, 16 and 18 are disposed in a common plane having grooved circumferential portions engageable with the edge of a disk record which is inserted through a slot 58 in the front face of housing 12. Roller 14, utilized as a disc record driving roller, engages the side circumferential edge of a disc record and when rotated by the drive adaptor 14A projecting through the upper surface of the housing causes the record to rotate. Roller 18 is rotatably mounted to the floor of housing 12. Roller 16 is rotatably mounted to a roller bracket 32 which is pivotally mounted by housing bracket pin 68 to the floor of housing 12. A spring 34 connected to bracket 56 provides pivotal tension to the roller bracket 32 and roller 16 when a disk record is in position. Linkage arm 36 is coupled to the bracket 32 at one end and at its opposite end to a Y-shaped pivot arm 38 through elliptical slot 66. Pivot arm 38 is rotatably coupled at its mid-section 40 to the top of the housing by a pin (not shown). Branch 44 of arm 38 is connected to cartridge return arm 26 while branch 60 is movably coupled to cartridge lift 42. Spring 54 is connected between return arm 26 and bracket 70, mounted on inside front face of housing 12. A cartridge track support 20 is coupled to the floor of the housing and has a V-shaped notch about midway along its length. The support 20 is coupled at the other end to a pair of cartridge guide rails 22. A cartridge 24 which includes a phonograph needle and transducer is slidably coupled to the cartridge guide rails 22. The phonograph cartridge 24 is conventional and well known in the art. The manually actuated cartridge return arm 26 has a grasping knob 30 protruding through slot 28 adjacent the front housing face.

The rollers 14, 16 and 18 are positioned relative to each other to engage a circumferential edge of the disc record and may be constructed for either 33⅓, 45 or 78 RPM sized records. The distance between roller 16 and roller 18 is selected to be less than the diameter of the record to be played, so that when a record is inserted through slot 58, the outer circumference will contact rollers 16 and 18, forcing roller 16 to be moved outwardly causing the linkage arm 36 to be moved to the right which, through the pivotal movement of arm 38 moves lifting arm 42 forcing the cartridge support arm 20 upward, raising the cartridge and needle sufficiently above the surface of the record so that the needle does not contact the record surface during the insertion or retraction of the record from applicant's device. Once the disc record is completely engaged between all three rollers 14, 16 and 18 (roller 16 returned to initial position), the cartridge support arm 20 is lowered by the reverse motion of linkage lifting arm 42 so that the needle will then engage the record surface. The cartridge return arm 26 is moveably engageable at one end to cartridge 24 and allows for the positioning of the cartridge manually and therefore the needle along the record for initial start and return after the record is finished playing. During the playing of the record, the cartridge and needle will track radially inward toward the center of the record along the guide rails 22 due to the rotational motion of the record, moving arm 26 with it. A pair of record guides 62 are disposed, one on each side of slot 58 to insure that the record during insertion is properly engaged in the rollers.

FIG. 2 shows a disc record 50 (in phantom) inserted in an operable position in contact with rollers 14, 16 and 18. In this position the record is rotated by the rotational movement of roller 14 which contacts the circumferential edge of the disc. The cartridge 24, through the engagement of the needle in the record surface, tracks across toward the center of the record until the recording is finished. At this time, manually moving the return arm 26 to the left causes linkage arm 38 to pivot about point 40 raising the cartridge and needle above the surface of the record to return the cartridge to its initial starting position adjacent the exterior circumference of the record. At this time the record is pulled out, again acting on a roller 16, lifting the cartridge and needle to achieve sufficient clearance so that the record may be withdrawn without engagement with the needle. Spring 54 holds the cartridge return arm 26 resiliently in position to prevent loose and random movement of the arm. The drive roller 14 is rigidly coupled to a driving means through the upper surface of housing 12 which is adapted to engage a tape recorder drive unit to which applicant's device is attached.

FIG. 3 shows an inside view of applicant's invention with the receiving slot 58 and rollers 14, 16 and 18 disposed in a common plane.

FIG. 4 shows the cartridge lifting mechanism for allowing the record to be inserted and retracted from the device without contacting the needle or cartridge. A lifting arm 42 slides horizontally (reciprocally) upon movement of pivot arm 38 (FIG. 1) and engages at its free end the V-shaped portion of resilient cartridge support 20 forcing the support 20 and cartridge 24 upward. Once the record is in position, the linkage arm will slide back to its initial position allowing the entire support 20 and cartridge arm to drop down so that the needle is then in the proper position to contact the surface of the record.

Figure 5:
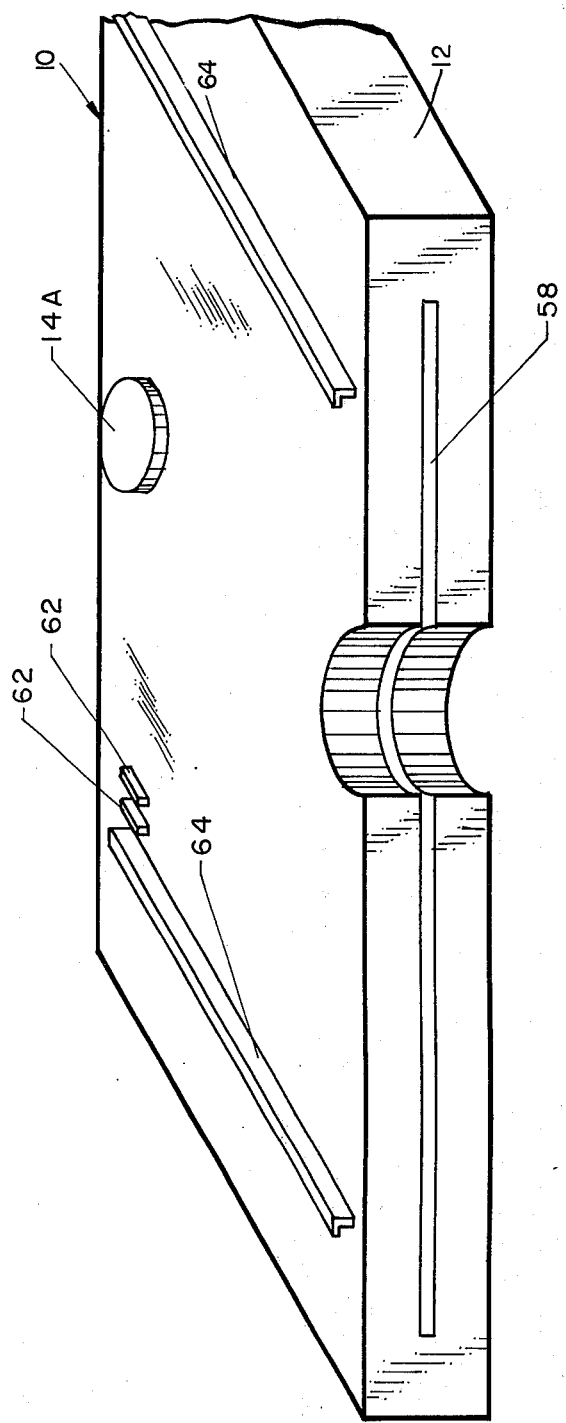
FIG. 5 shows the exterior housing utilized in applicant's invention in perspective.

FIG. 5 shows the top of housing 12, with structure for mounting applicant's device to a conventional tape recorder in order to utilize the amplification system and the driving mechanism of the tape system to operate applicant's device. The upper top surface of housing 12 is shown having a pair of connecting L-shaped rails 64 which engage appropriately shaped holding slots in the bottom of a tape recorder housing (not shown) connecting both of the units together rigidly. The pair of electrical jacks 62 are received into female jacks from the bottom of the tape recorder housing so that the amplification means of a tape recorder is utilized electrically through the jacks allowing for the use of only one amplification system. Conventiontal circuits are utilized to adapt the phonograph signal to the tape amplification system. The jacks are wired to cartridge 24 with a conventional circuit which has not been shown in the drawings. The drive coupling means 14A which is rigidly connected to roller 14 within the housing 12 engages the driving means of the tape recorder and rotates whenever the tape driving means is actuated in order to provide rotation of the record as discussed previously.

In another embodiment, the basic system described by Applicant may be utilized with its own driving power source and amplification system. In this embodiment one of the rollers would be selected and connected directly to the electric motor with appropriate shut-off switches for rotating the roller and driving the record in the manner as shown in the first embodiment. Likewise, the necessary audio reproduction and amplification system would be connected to the cartridge of applicant's invention and an appropriate speaker system utilized, thus allowing for a single integral unit to be placed in a vehicle, or the like providing disc record playout in any mobile environment. The cartridge support arm 20 shown in FIG. 1 is of a resilient material and is positioned so that when the cartridge is engaged with the disc there is a biasing that holds the needle in the groove.

Thus, applicant has provided an attachable disc record player capable of mounting to a conventional tape recorder which may be utilized in a mobile environment for the playing of disc records in a vehicle or the like.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A disc record support and drive device comprising:
   a housing;
   at least three rollers coupled to said housing and disposed in a common plane an equal radial distance from a predetermined point within said housing to the edge of said rollers, one of said rollers being pivotally moveable relative to said housing and said predetermined point;
   means connected to one of said rollers and said housing for rotating said roller;
   a phonograph cartridge;
   cartridge support means coupled to said housing and said cartridge, said cartridge radially moveable along said cartridge support means; and
   linkage means connecting said pivotally mounted roller and said cartridge for lifting said cartridge whenever said roller is pivoted, whereby a disc record inserted in the plane of said rollers to engage said rollers will move said pivotal roller lifting the cartridge mechanism above the surface of the record.

2. A disc record support and drive mechanism connectable to a tape recorder system having a drive unit including:
   at least three rollers coupled to said housing and disposed in a common plane an equal radial distance from a predetermined point within said housing to the edge of said rollers, one of said rollers being pivotally moveable relative to said housing and said predetermined point;
   means connected to one of said rollers and said housing for rotating said roller;
   a pair of mounting brackets attached to the outside surface of said housing for mounting said housing to a tape recorder housing; and
   a drive adapter connected to one of said rollers, said drive adapter projecting through said housing and engageable with the drive unit in said tape recorder system.

* * * * *